United States Patent
Kumar et al.

(10) Patent No.: US 7,707,372 B1
(45) Date of Patent: Apr. 27, 2010

(54) UPDATING A CHANGE TRACK MAP BASED ON A MIRROR RECOVERY MAP

(75) Inventors: Mukul Kumar, Maharashtra (IN); Ronald S. Karr, Palo Alto, CA (US); Subhojit Roy, Maharashtra (IN); Prasad Limaye, Maharashtra (IN); Raghu Krishnamurthy, Santa Clara, CA (US); Anand A. Kekre, Maharashtra (IN)

(73) Assignee: Symantec Operating Corporation, Mountain View, CA (US)

( * ) Notice: Subject to any disclaimer, the term of this patent is extended or adjusted under 35 U.S.C. 154(b) by 528 days.

(21) Appl. No.: 10/882,112

(22) Filed: Jun. 30, 2004

(51) Int. Cl.
*G06F 12/00* (2006.01)

(52) U.S. Cl. .................... 711/162; 711/166

(58) Field of Classification Search ........... 711/162, 711/166
See application file for complete search history.

(56) References Cited

U.S. PATENT DOCUMENTS

| | | | | |
|---|---|---|---|---|
| 4,814,971 | A | 3/1989 | Thatte | 714/15 |
| 5,930,824 | A * | 7/1999 | Anglin et al. | 711/162 |
| 6,101,585 | A * | 8/2000 | Brown et al. | 711/162 |
| 6,145,066 | A * | 11/2000 | Atkin | 711/165 |
| 6,199,074 | B1 * | 3/2001 | Kern et al. | 707/204 |
| 6,748,504 | B2 | 6/2004 | Sawdon et al. | 711/162 |
| 6,804,755 | B2 * | 10/2004 | Selkirk et al. | 711/165 |
| 6,820,098 | B1 * | 11/2004 | Ganesh et al. | 707/202 |
| 6,993,539 | B2 | 1/2006 | Federwisch et al. | 707/201 |
| 7,096,330 | B1 * | 8/2006 | Root et al. | 711/162 |
| 7,103,796 | B1 * | 9/2006 | Kekre et al. | 714/6 |
| 7,523,276 | B1 * | 4/2009 | Shankar, Vinod R. | 711/162 |
| 2002/0178335 | A1 * | 11/2002 | Selkirk et al. | 711/162 |
| 2003/0005235 | A1 | 1/2003 | Young | 711/141 |
| 2003/0172316 | A1 * | 9/2003 | Tremblay et al. | 714/7 |
| 2003/0189930 | A1 * | 10/2003 | Terrell et al. | 370/389 |
| 2004/0143642 | A1 * | 7/2004 | Beckmann et al. | 709/213 |
| 2005/0027892 | A1 * | 2/2005 | McCabe et al. | 709/253 |
| 2005/0033878 | A1 | 2/2005 | Pangal et al. | 710/36 |
| 2005/0081091 | A1 * | 4/2005 | Bartfai et al. | 714/6 |
| 2005/0193272 | A1 | 9/2005 | Stager et al. | 714/42 |
| 2005/0256972 | A1 * | 11/2005 | Cochran et al. | 709/245 |
| 2005/0278486 | A1 | 12/2005 | Trika et al. | 711/142 |

OTHER PUBLICATIONS

Brocade, "*Optimizing Fabric Applications With Brocade XPath Technology*," White Paper, Published Feb. 10, 2003, © 2003 Brocade Communications Systems, Inc., 12 pages.
VERITAS, "*VERITAS Storage Foundation—Technical Overview*," White Paper, Apr. 2002, © 2002 VERITAS Software Corporation, 37 pages.

(Continued)

*Primary Examiner*—Reba I Elmore
(74) *Attorney, Agent, or Firm*—Campbell Stephenson LLP

(57) ABSTRACT

One method of updating a change track map involves resetting a mirror recovery map for a data volume. Just before the mirror recovery map is reset, a change track map for the data volume can be updated, using the mirror recovery map. The mirror recovery map can be reset by a data element of a data processing system, while the change track map can be updated by a control element of the data processing system.

24 Claims, 5 Drawing Sheets

OTHER PUBLICATIONS

"FastResync (Fast Mirror Resynchroniztion)" Chapter 3: Volume Manager Operating, VERITAS Volume Manager 3.1 Administrator's Guide, Jun. 2001. Pages 1-5. http://docs.hp.com/en/B7961-90018/ch03s12.html?btnNext=next%A0%BB.

"Online Backups Using the VxVM Snapshot Facility". Sun BluePrints Online. Sun Microsystems, Sep. 2000. Pages 1-7.

Dirty Region Logging (aka: DRL) The Cuddletech VERITAS Volume Manager Series: Advance VERITAS Theory. Updated/Created Oct. 2, 2002. Accessed Sep. 8, 2006. http://web.archive.org/web/20021005160814/http:www.cuddletech.com/veritas/advx/x49.html.

Niranjan S. Pendharkar and Subhojit Roy, pending U.S. Patent Application entitled "System and Method for Updating A Copy-On-Write Snapshot Based on a Dirty Region Log." U.S. Appl. No. 11/029,053, filed Jan. 4, 2005, including Specification: pp. 1-18, Drawings: Figures 1-5 on 5 sheets.

* cited by examiner

UPDATING A CHANGE TRACK MAP BASED ON A MIRROR RECOVERY MAP

BACKGROUND

1. Technical Field

The present invention relates to data storage and management generally and more particularly to a method and system for update tracking.

2. Description of the Related Art

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Several techniques utilized to minimize data loss and improve the availability of data require write operations or "updates" to a data volume be tracked, logged, or journaled. For example, such update tracking is commonly used in data mirroring systems to resynchronize a snapshot data volume which has been created by detaching a mirror data volume from a corresponding primary data volume. In such a scenario, data specifying each update to a primary data volume and/or a snapshot data volume is stored following mirror data volume detachment (commonly referred to as "third-mirror breakoff" or "mirror-breakoff"). Consequently, only those regions which have been modified following mirror breakoff need be synchronized, thus conserving valuable network and data processing system resources. Similarly, such an update tracking is also used in data mirroring system to resynchronize a mirror copy when it is brought online following a detach process due to an I/O error. In another embodiment, the change tracking is used to resynchronize a secondary volume or "replica") at a disaster recovery site when an associated replication process is restarted following a network outage or failure of the secondary disaster recovery site.

Another technique commonly used to improve the accessibility of data and reduce the probability of data loss is storage virtualization. Storage virtualization is the pooling of physical storage from multiple network storage devices into what appears from a user or user application perspective to be a single storage device. Storage virtualization is often used as part of a storage area network (SAN). A virtual storage device appears as one storage device, regardless of the types of storage devices (e.g., hard disk drives, tape drives, or the like) pooled to create the virtualized storage device. Storage virtualization may be performed in a host data processing system, a SAN fabric, or in storage devices directly. In some conventional systems (e.g., where virtualization is provided in a SAN fabric), virtualization operations are partitioned between specialized hardware (e.g., an application specific integrated circuit or "ASIC" or a proprietary architecture processor, or the like) responsible for the servicing of input/output requests (e.g., the performance of updates) and associated translation between virtual and physical addresses and generalized hardware in combination with software (e.g., a general purpose processor) responsible for establishing the address translation mappings and performing more complex operations.

Tracking updates to a data volume within such a sectioned storage virtualization system requires a transition between the operation of the aforementioned specialized hardware and generalized hardware/software combination (e.g., to perform additional processing through a "fault" mechanism which causes an interrupt and context switch) and consequently disruption of the ordinary processing of updates. As the processing of updates may or may not require a fault or other disruption, the performance of update tracking in a system where virtualization is provided in a SAN fabric may add substantial latency to the performance of write operations.

SUMMARY

Disclosed is a method and system for update tracking within a storage virtualization device. According to one embodiment of the present invention, a method is provided in which a first update map is maintained for a data volume and a second update map is then updated for the data volume using the first update map. In another embodiment, the first update map is maintained using a virtualization device of a storage area network fabric. Embodiments of the present invention may be used to reduce the latency with which write operations or "updates" may be performed within a system providing storage virtualization within a storage area network fabric as well as reducing the number of data structures required to store update tracking data for a given data volume.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
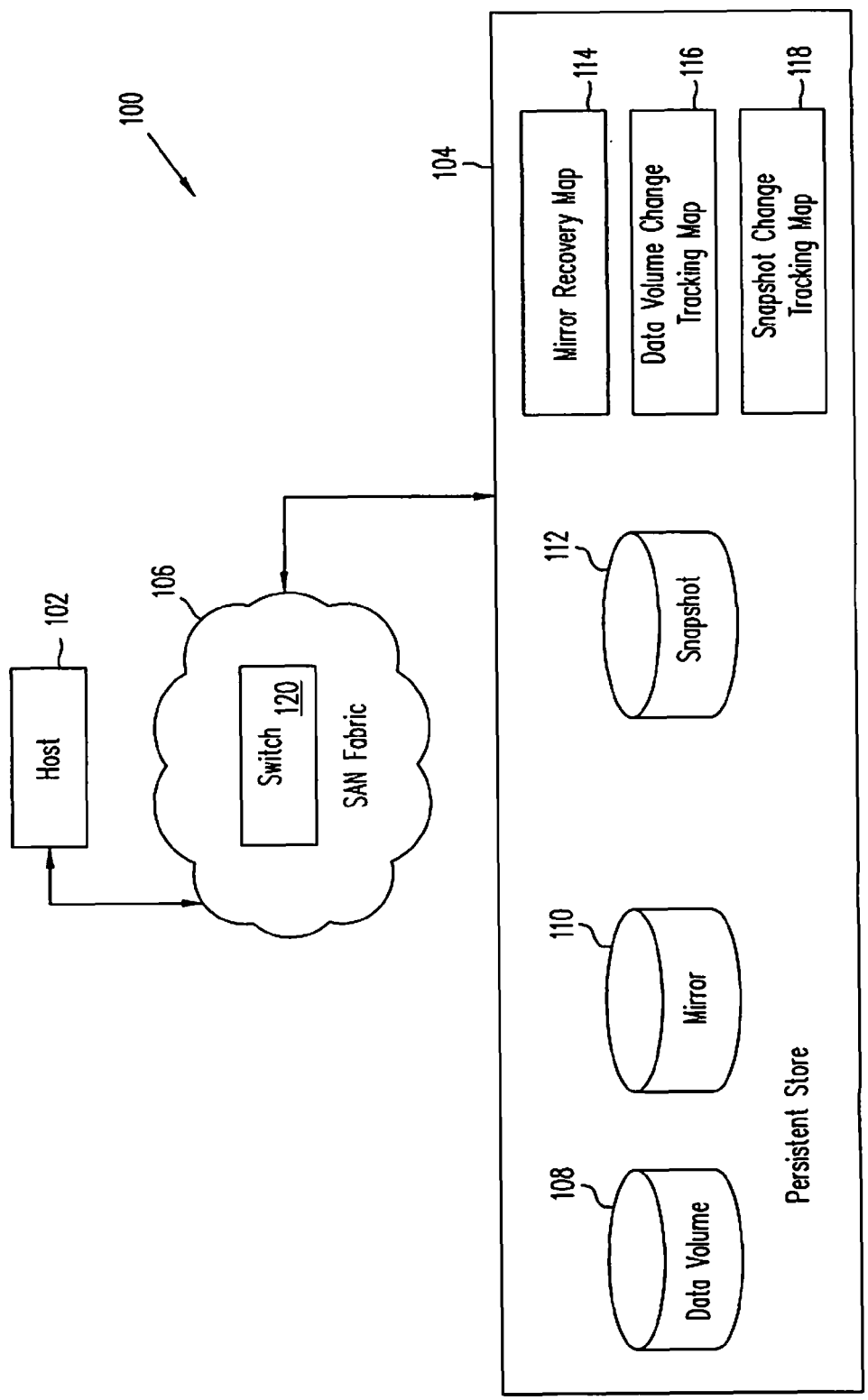
FIG. 1 illustrates a storage area network (SAN) including a data processing system of an embodiment of the present invention.

FIG. 1 illustrates a storage area network (SAN) including a data processing system of an embodiment of the present invention. In the embodiment of FIG. 1, a SAN 100 is depicted including a host data processing system 102 coupled to persistent storage 104 via a SAN fabric 106. A SAN is a high-speed special-purpose network (or subnetwork) that interconnects different kinds of data storage devices with associated host data processing systems or "servers" on behalf of a larger network of users or user systems or "clients". Typically, a storage area network is part of the overall network of computing resources for an enterprise. SANs support a number of data storage and management techniques including disk mirroring, backup and restore, archival and retrieval of archived data, data migration from one storage device to another, and the sharing of data among different host data processing systems in a network. SANs can incorporate subnetworks with network-attached storage (NAS) systems.

Persistent store 104 of the embodiment of FIG. 1 may be provided using one or more of any of a variety of storage devices including direct access storage devices, conventional hard disks, tape drives, network-attached storage devices, or storage arrays (e.g., JBOD or RAID arrays), or the like. Persistent store 104 includes a primary data volume 108, a mirror data volume 110, and a snapshot data volume 112, as well as a group of update maps (e.g., a mirror recovery map 114, a primary data volume change track map 116, and a snapshot data volume change track map 118). In other embodiments of the present invention however, persistent store 104 need not include all those elements shown.

For example, persistent store 104 may alternately include primary data volume change track map 116 or snapshot data volume change track map 118 according to one embodiment. In another embodiment, persistent store 104 does not include mirror data volume 110 and mirror recovery map 114 is utilized as a change track map such that persistent store 104 need not include primary data volume change track map 116 or snapshot data volume change track map 118. Similarly, while persistent store 104 of the embodiment of FIG. 1 includes snapshot data volume 112, other embodiments of the present invention may alternatively include other storage objects (e.g., snappoint storage objects, linked volumes, or the like) associated with or potentially benefiting from change tracking.

According to one embodiment of the present invention, mirror recovery map 114 includes a dirty region log (DRL) as distinguished from a change track map. Within the present description, the terms mirror recovery map or dirty region log are used to indicate an update map, log, or journal which is used or intended to be used exclusively for the purpose of ensuring the synchronization of one or more mirror data volumes or plexes while the term change track map is used to indicate an update map used for any other purpose (e.g., resynchronization of mirror breakoff snapshots, or the like).

More specifically, a mirror recovery map or DRL is used to indicate or track an update to a primary data volume as pending until the update has been applied to all mirror data volumes associated with the primary data volume. Using this map all mirrors can be synchronized to bring the data volume to a consistent state after a failure of the data processing system. Consequently, data within a mirror recovery map or DRL may be discarded or reset as soon as an associated update has been applied to all mirror data volumes and is only used in conjunction with data volume mirroring. A mirror recovery map or DRL may be maintained but not needed or utilized for mirror recovery in all instances (e.g., where a data volume is associated with a single mirror or no mirrors).

By contrast, a change track map may be used independently of mirroring and may contain data which needs to be retained following the completion of an associated update to any data volume (primary data volume, secondary replica data volume, mirror data volume, snapshot data volume, or the like). For example, where a change track map is created to enable a mirror breakoff snapshot to be resynchronized with an associated primary data volume, updates to both the primary data volume and to the mirror breakoff snapshot data volume may be tracked using separate change track maps. Hence, there may be multiple change track maps associated with a data volume to track updates for one or more purposes, time periods, or the like. All change track maps are required to be updated on every write in addition to DRL. A data volume within the present description may include a logical or physical storage element, or any combination thereof (e.g., one or more bits, bytes, words, sectors, tracks, platters, disk partitions, slices, physical disks, disk arrays, storage subsystems, network attached storage or storage array network arrays, logical subdisks, plexes, volumes, logical or volume manager disk groups or disks or the like).

SAN fabric 106 of SAN 100 of the embodiment of FIG. 1 includes a data processing system according to an embodiment of the present invention, virtualization switch 120. In the illustrated embodiment, virtualization switch 120 performs storage virtualization functions including translation between virtual and physical addresses as well as providing functionality of one or more storage applications (e.g., VERITAS Storage Replicator, VERITAS Volume Replicator, and/or VERITAS Volume Manager provided by VERITAS Software Corporation of Mountain View, Calif.). While virtualization functionality has been illustrated as being embodied within SAN fabric 106, in other embodiments of the present invention storage virtualization may be provided in whole or in part alternately within a host data processing system such as host data processing system 102 or a storage device associated with persistent store 104. For example, in one embodiment shared storage is provided among a number of host data processing systems. In the described embodiment, both a single shared or "global" change track map and individual per-host update maps (for each host data processing system having access to the shared storage) are provided. Asynchronous or "batched" communication is utilized to coordinate the updating of the global change track map using the individual per-host maps.

Figure 2:
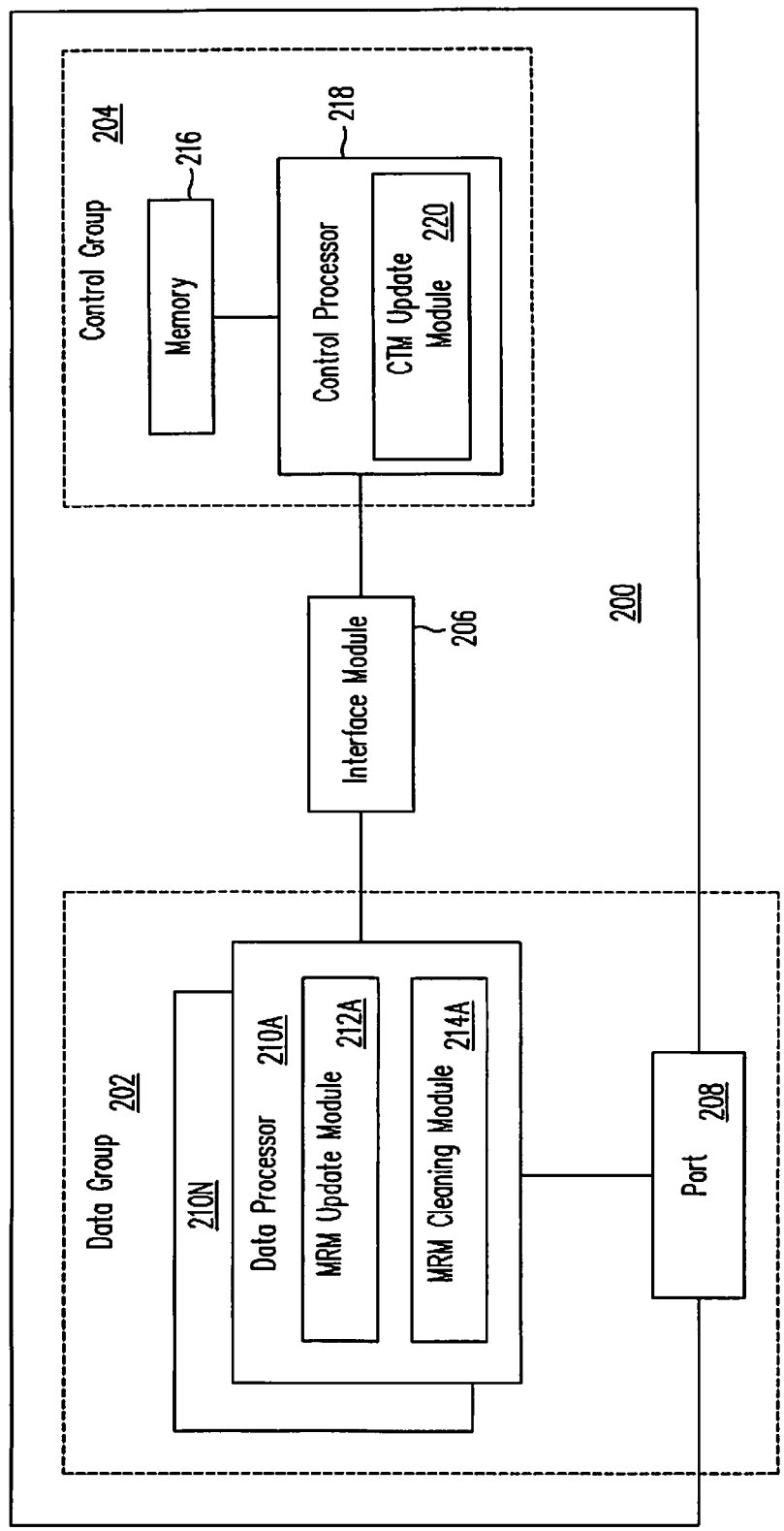
FIG. 2 illustrates a block-level diagram of a data processing system according to an embodiment of the present invention.

FIG. 2 illustrates a block-level diagram of a data processing system according to an embodiment of the present invention. According to one embodiment, data processing system 200 of FIG. 2 is a virtualization switch such as virtualization switch 120 of FIG. 1. Data processing system 200 includes and is divided into a data group 202 and a control group 204 which are communicatively coupled together using an interface module 206 as shown. In the illustrated data processing system 200 of FIG. 2, data group 202 is utilized to process input/output (I/O) transactions including updates or write operations while control group 204 is utilized to perform more complex tasks such as establishing data structures and mapping constructs used by data group 202, handling errors, exceptions, interrupts, faults, or the like generated or indicated by data group 202, and providing higher-level storage application functionality (e.g., replication, backup, or the like).

In the embodiment of FIG. 2, data group 202 of data processing system 200 includes a port 208 used to receive and transmit data (e.g., data associated with I/O transactions and requests to perform additional operations) and one or more data processors 210a-210n, each including a mirror recovery map (MRM) update module 212 and a mirror recovery map cleaning module 214 as shown. For purposes of the present description, a "module" may include hardware, firmware, software, or any combination thereof including micro-instructions, machine code, object code, or source code instructions, code segments, routines, code libraries, state machine state or the like. In the illustrated embodiment, MRM update module 212 detects each update received at port 208 and responsively maintains a mirror recovery map for one or more associated data volumes by automatically setting a corresponding bit to indicate the location within an associated data volume of each update received.

Accordingly, a mirror recovery map may be maintained for each data volume for which an update is received using data group 202 without the use of control group 204. According to one embodiment, such mirror recovery maps are stored in memory or storage (not shown) within or associated with one or more of data processors 210a-210n. Mirror recovery map cleaning module 214 of the described embodiment is used, according to the illustrated embodiment, to then periodically clean (e.g., by resetting) one or more bits of each mirror recovery map. Both the frequency with which the described cleaning is performed and what bits are identified or targeted for cleaning may be dynamically or statically determined using any of a variety of algorithms or techniques.

Before each cleaning operation is performed, a first signal is transmitted from data group 202 to control group 204 via interface module 206 to indicate the impending mirror recovery map cleaning operation and potential loss of data. In response to a receipt of the first signal, control group 204 is used to perform some processing on a mirror recovery map before it can be cleaned (e.g., to coalesce or copy the data/bits to be cleaned to one or more maps or data structures) and to responsively transmit a second signal to data group 202 thereafter. According to one embodiment of the present invention, each of data processors 210a-210n includes an ASIC and/or a proprietary architecture processor or processor core such as an Advanced RISC Machines (ARM) processor core provided by ARM Ltd of Cambridge, England. In alternative embodiments of the present invention, data processors 210a-210n may include other specialized hardware such as programmable logic devices or generalized hardware in combination with software lacking change track map capability.

In the embodiment of FIG. 2, control group 204 of data processing system 200 includes a memory 216 coupled with a control processor 218 including a change track map (CTM) update module 220 as shown. In the illustrated embodiment, change track map update module 220 updates a change track map of a data volume using a corresponding mirror recovery map. Initially, transmission of a first signal indicating an impending mirror recovery map cleaning operation from data group 202 to control group 204 via interface module 206 is detected.

Once a transmission of the first signal is detected, one or more bits of a mirror recovery map corresponding to a change track map to be updated are logically combined (e.g., using a logical OR operation) with the change track map to be updated. According to one embodiment, at least those bits to be cleaned in the impending cleaning operation are logically combined with the change track map to be updated. In other embodiments, an entire mirror recovery map or a portion thereof is logically combined with the change track map to be updated.

Thereafter a second signal indicating the change track map has been successfully updated is transmitted from control group 204 to data group 202 using interface module 206. In yet another embodiment of the present invention, an application programming interface (API) is used to prevent the performance of any cleaning operations such that a mirror recovery map which is being automatically maintained by one or more elements of data group 202 may be utilized as a change track map for a given data volume. In the described embodiment, the synchronization of a data volume for which a mirror recovery map is being used as a change track map cannot be guaranteed without the creation or use of some other mirror recovery map or mirror synchronization technique or resource.

Figure 3A:
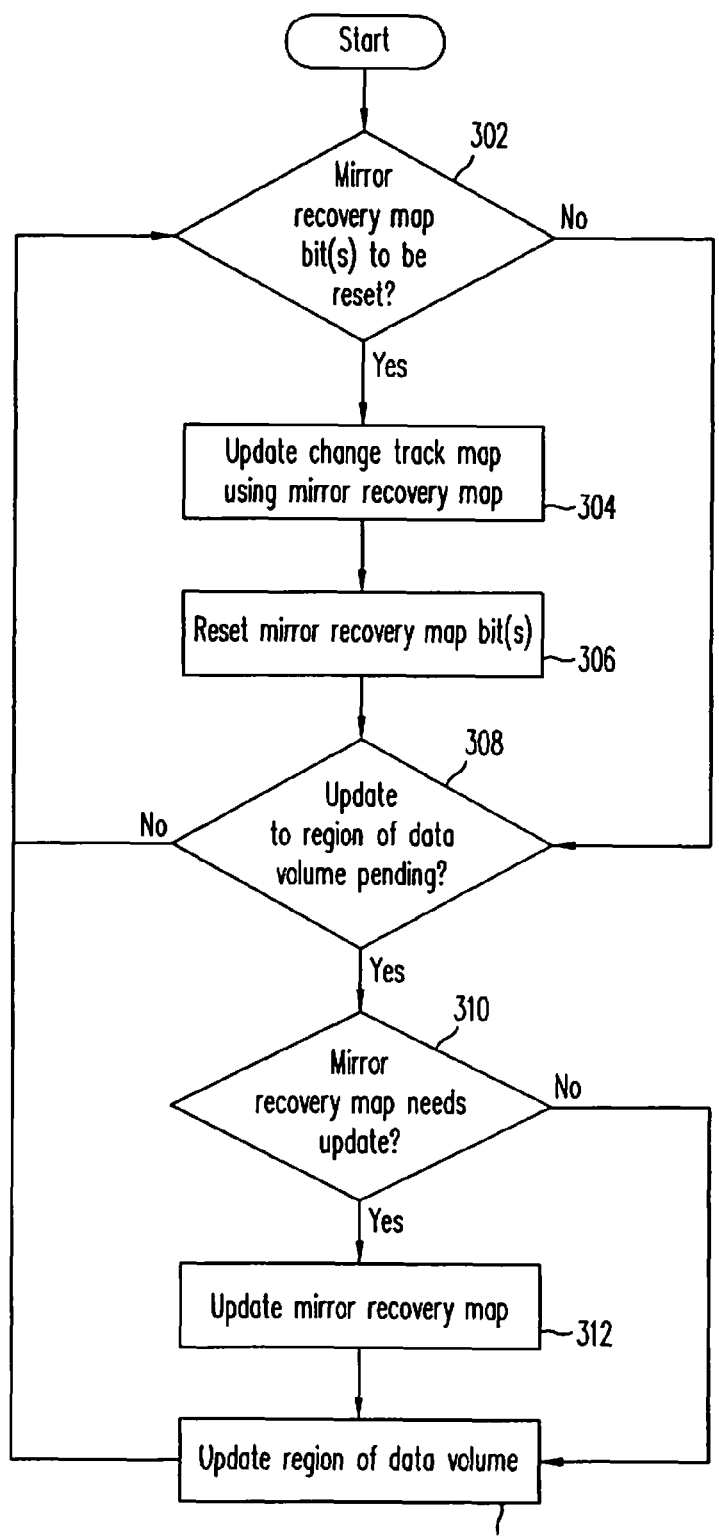
FIGS. 3A and 3B illustrate an update tracking process diagram and associated data volume and update map status according to an embodiment of the present invention, respectively.
Figure 3B:
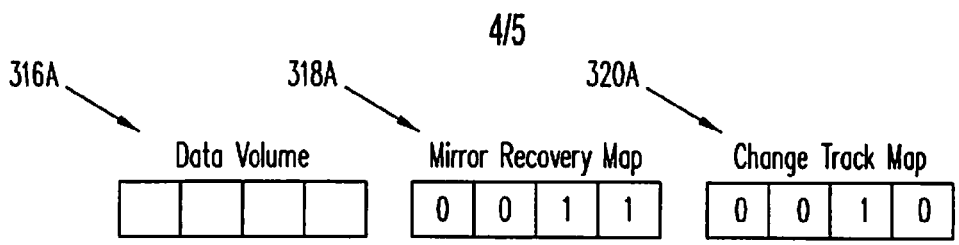
Figure 3B:
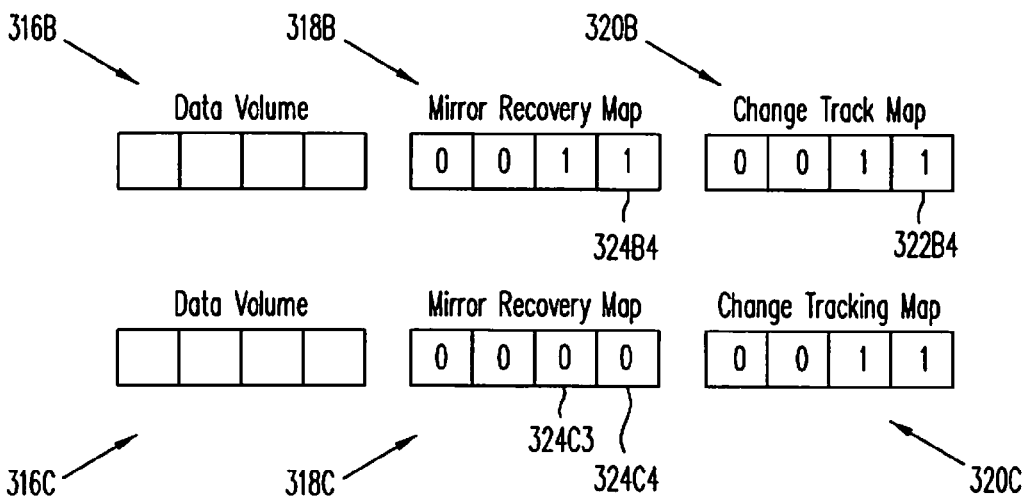
Figure 3B:
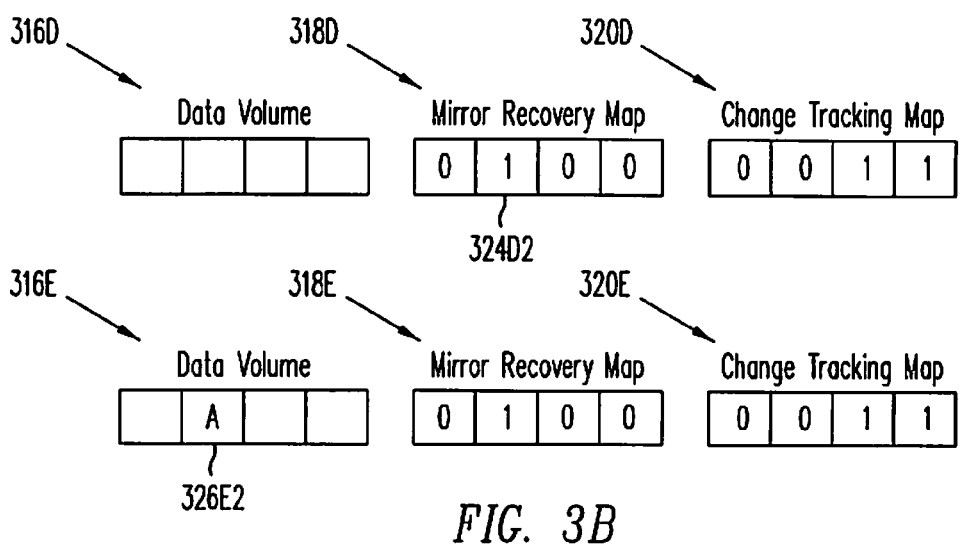

FIGS. 3A and 3B illustrate an update tracking process diagram and associated data volume and update map status according to an embodiment of the present invention, respectively. At an initial point, before the process illustrated by FIG. 3A is begun, a data volume 316A, a mirror recovery map 318A, and a change track map 320A are illustrated as shown. While no data has been explicitly indicated or depicted within data volume 316A-316D (as the actual data values are not critical to the present description) any type and/or value of data may be contained initially within data volume 316. In the depicted initial state, a bit value of logical one (1) in the third and fourth bit positions of mirror recovery map 318A and the third bit position of change track map 320A indicates the occurrence of previous updates or write operations to corresponding bit positions or regions of data volume 316A where one (indicated by the third bit position) update has been applied or tracked using change track map 320A and another (indicated by the fourth bit position) has not. While bit values of logical one (1) and logical zero (0) have been illustrated herein with respect to FIG. 3B, in alternative embodiments of the present invention a greater or lesser number of bit value states or other values or indicators may be used to indicate whether or not an update or write operation has been performed at or on a corresponding data volume region.

In the illustrated process embodiment of FIG. 3A, an initial determination is made whether any bits of mirror recovery map 318A are to be reset (process block 302), in other words, whether a cleaning operation or "cleaning cycle" is pending or due. If a determination is made that no mirror recovery map bits are to be reset, the illustrated process continues as illustrated (process block 308). Otherwise, change track map 320B is updated using mirror recovery map 318B (process block 304), for example, by performing a logical OR operation between mirror recovery map 318B and change track map 320B. Consequently, the logical one (1) value of bit position 324B4 of mirror recovery map 318B is applied or copied to bit position 322B4 of change track map 320B. Thereafter, one or more bits (e.g., bit positions 324C3 and 324C4) of mirror recovery map 318C may be reset or cleared as shown (process block 306)

Once a cleaning cycle has been performed on mirror recovery map 318C and one or more bits cleared, or following a determination that no bits of a mirror recovery map are to be cleared a given instant of time, a determination is made whether there are any updates pending to a region of data volume 316C (process block 308). If a determination is made that no data volume updates are pending, the illustrated process embodiment cycles until either a mirror recovery map bit is to be reset or an update to a data volume region is to be performed as shown.

While a particular order of operations has been depicted in FIG. 3A for the sake of clarity, in alternative embodiments of the present invention the illustrated order may be varied with one or more operations being performed substantially simultaneously or in parallel. For example, in one embodiment an interrupt or "callback" generated by another entity (e.g., a data group or processor) is used to signal that one or more mirror recovery map bits are to be reset or cleaned such that an explicit determination (as illustrated at process block 302) is unnecessary. Following a determination that a data volume update is pending, a subsequent determination is made whether mirror recovery map 318D needs to be updated (process block 310) to reflect the pending data volume update.

If an update has been applied to the same region of data volume 316D associated with the current, pending data volume update and no mirror recovery map cleaning or reset operations have been subsequently performed no mirror recovery map update should be required. If however no update has been applied or no update has been applied since the last cleaning operation affecting associated mirror recovery map bits, then a mirror recovery map update should be performed (process block 312). For example, in the embodiment depicted by FIG. 3B a logical one (1) is applied or copied to bit position 324D2 to indicate the impending occurrence of an update to a corresponding region of data volume 316D. If no mirror recovery map update is required or after such an update is performed, the pending update may be applied to data volume 316E (process block 314) as illustrated by the presence of the value 'A' at region 326E2 of data volume 316E.

Figure 4:
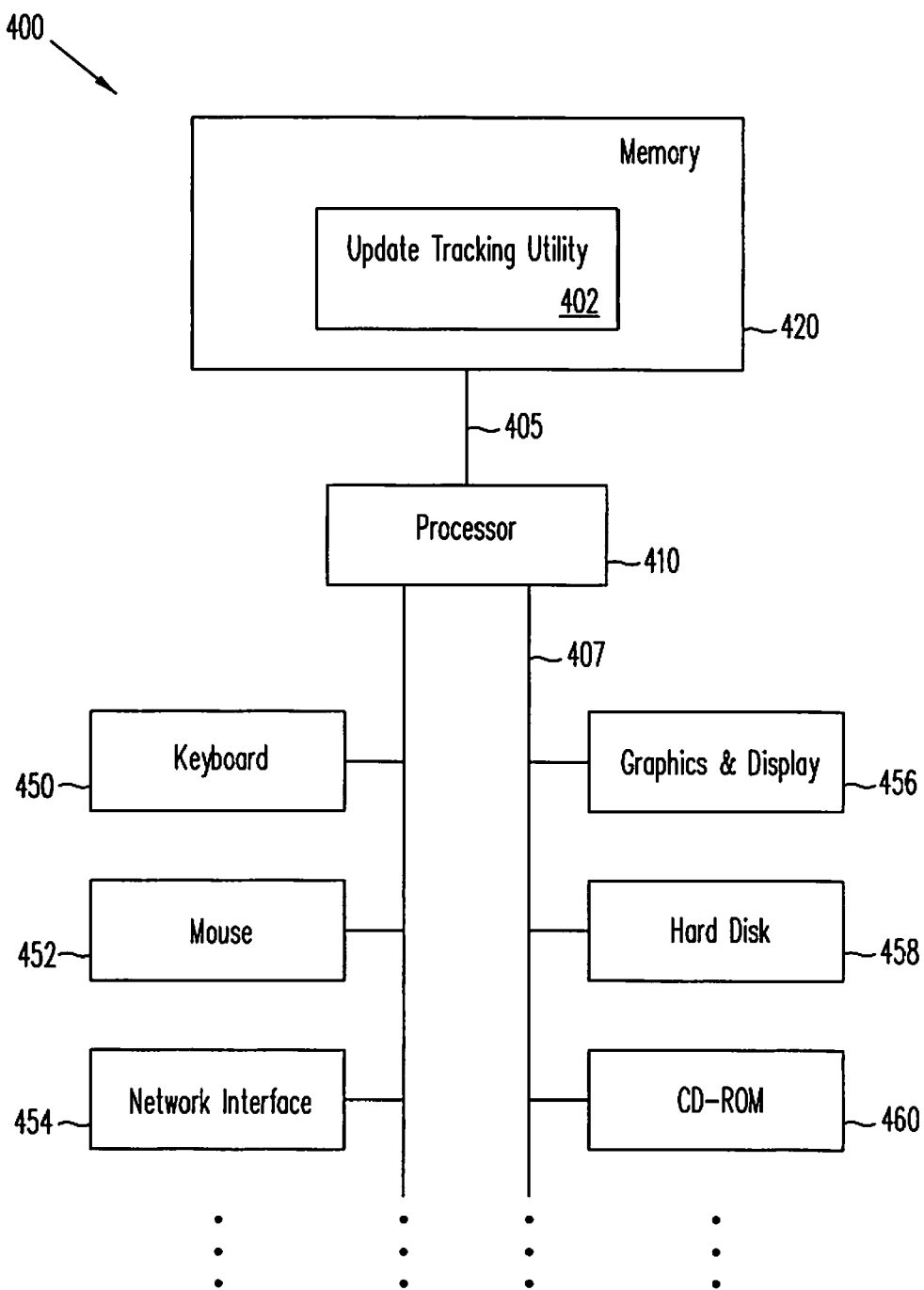
FIG. 4 illustrates a block-level diagram of a data processing system according to an alternative embodiment of the present invention.

FIG. 4 illustrates a block-level diagram of a data processing system according to an alternative embodiment of the present invention. Data processing system 400 can be used, for example, to implement one or more nodes of a larger data processing system. Data processing system 400 of the illustrated embodiment includes a processor 410 and a memory 420 coupled together by communications bus 405. Processor 410 can be a single processor or a number of individual processors working together. Memory 420 is typically random access memory (RAM), or some other dynamic storage device, and is capable of storing instructions to be executed by the processor(s), e.g., update tracking utility 402. Memory 420 is also used for storing temporary variables or other intermediate data during the execution of instructions by processor 410. Data processing system 400 of the illustrated also includes devices such as keyboard 450, and mouse 452, network interface 454, graphics & display 456, hard disk 458, and CD-ROM 460, all of which are coupled to processor 410 by communications bus 407. It will be apparent to those having ordinary skill in the art that data processing system 400 can also include numerous elements not shown in the figure, such as additional storage devices, communications devices, input devices, and output devices, as illustrated by the ellipsis shown.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Shell, Perl and Tcl/Tk. Update tracking utility 402 can be provided to the data processing system via a variety of machine-readable media including electronic media (e.g., flash memory), magnetic storage media (e.g., hard disk 458, a floppy disk, etc.), optical storage media (e.g., CD-ROM 460), and communications media conveying signals encoding the instructions (e.g., via a network coupled to network interface 454).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
resetting a mirror recovery map for a data volume, wherein said mirror recovery map comprises information usable to synchronize a plurality of mirrors; and
updating a change track map for said data volume, using said mirror recovery map, wherein said change track map tracks changes to said data volume relative to another data volume, wherein
said mirror recovery map comprises a first plurality of bits,
said change track map comprises a second plurality of bits, and
said updating comprises
performing a logical OR operation on said first plurality of bits and said second plurality of bits.

2. The method of claim 1, wherein
said mirror recovery map is automatically maintained by a data element.

3. The method of claim 1, wherein said updating said change track map comprises updating a plurality of change track maps for said data volume using said mirror recovery map.

4. The method of claim 1, wherein
said resetting comprises resetting, for each of a plurality of host data processing systems, one of a plurality of per-host mirror recovery maps for said data volume, and
said updating comprises updating a shared change track map for said data volume using said plurality of per-host mirror recovery maps.

5. The method of claim 1, wherein said updating further comprises:
receiving a request to access said change track map; and
updating said change track map using said mirror recovery map, in response to said receiving.

6. The method of claim 1, further comprising:
detaching a mirror data volume from said data volume;
reattaching said mirror data volume to said data volume; and
resynchronizing said mirror data volume and said data volume using said change track map, in response to said reattaching.

7. The method of claim 1, wherein
said resetting said mirror recovery map is performed by a data element of a data processing system, and
said updating said change track map is performed by a control element of said data processing system.

8. The method of claim 7, wherein said data processing system comprises a virtualization device of a storage area network fabric.

9. The method of claim 7, wherein
said mirror recovery map comprises a plurality of bits, and
said updating further comprises
receiving a signal at said control element, wherein said signal is associated with an attempt to modify a bit of said plurality of bits, and said bit comprises a bit to indicate receipt of an update to a corresponding region of said data volume, and
updating said change track map, in response to said receiving.

10. The method of claim 7, wherein said updating further comprises:
detecting a failure of said data processing system; and
updating said change track map using said mirror recovery map, in response to said detecting.

11. A method comprising:
resetting a mirror recovery map for a data volume, wherein said mirror recovery map comprises information usable to synchronize a plurality of mirrors;
updating a change track map for said data volume, using said mirror recovery map, wherein said change track map tracks changes to said data volume relative to another data volume;
suspending replication between said data volume and a secondary data volume;
resuming replication between said data volume and said secondary data volume; and
resynchronizing said secondary data volume and said data volume using said change track map, in response to said resuming.

12. The method of claim 11, wherein
said mirror recovery map comprises a first plurality of bits,
said change track map comprises a second plurality of bits, and
said updating comprises
performing a logical OR operation on said first plurality of bits and said second plurality of bits.

13. A machine-readable storage medium having a plurality of instructions embodied therein, wherein said plurality of instructions are executable to:
reset a mirror recovery map for a data volume, wherein said mirror recovery map comprises information usable to synchronize a plurality of mirrors; and
update a change track map for said data volume using said mirror recovery map, wherein said change track map tracks changes to said data volume relative to another data volume, wherein
said mirror recovery map comprises a first plurality of bits,
said change track map comprises a second plurality of bits, and
said program instructions are executable to
perform a logical OR operation on said first plurality of bits and said second plurality of bits.

14. The machine-readable storage medium of claim 13, wherein
said mirror recovery map is reset by a data element of a data processing system, and
said change track map is updated by a control element of said data processing system.

15. The machine-readable storage medium of claim 14, wherein
said mirror recovery map is automatically maintained using said data element.

16. The machine-readable storage medium of claim 14, wherein
said mirror recovery map comprises a plurality of bits, and
said program instructions are executable to
detect a signal at said control element, wherein
said signal is associated with an attempt to modify a bit of said plurality of bits, and
said bit comprises a bit to indicate receipt of an update to a corresponding region of said data volume, and
update said change track map, in response to said signal.

17. An apparatus comprising:
means for resetting a mirror recovery map for a data volume, wherein said mirror recovery map comprises information usable to synchronize a plurality of mirrors; and
means for updating a change track map for said data volume using said mirror recovery map, wherein said change track map tracks changes to said data volume relative to another data volume map, wherein
said mirror recovery map comprises a first plurality of bits,
said change track map comprises a second plurality of bits, and
said means for updating comprises
means for performing a logical OR operation on said first plurality of bits and said second plurality of bits.

18. The apparatus of claim 17, wherein
said mirror recovery map is automatically maintained by a data element.

19. The apparatus of claim 17, wherein
said means for resetting comprises means for resetting said mirror recovery map using a data element of a data processing system, and
said means for said updating comprises means for updating said change track map using a control element of said data processing system.

20. The apparatus of claim 19, wherein
said mirror recovery map comprises a plurality of bits, and
said means for updating further comprises
means for receiving a signal at said control element, wherein
said signal is associated with an attempt to modify a bit of said plurality of bits, and
said bit comprises a bit to indicate receipt of an update to a corresponding region of said data volume, and
means for updating said change track map, in response to a receipt of said signal.

21. A data processing system comprising:
a data processor configured to present a virtual data volume to a host data processing system using a storage device and to indicate a receipt of an update to a region of said virtual data volume using a mirror recovery map, wherein said mirror recovery map comprises information usable to synchronize a plurality of mirrors;
a control processor coupled to said data processor and configured to update a change track map for said virtual data volume using said mirror recovery map, wherein said change track map tracks changes to said data volume relative to another data volume map; and
an interface module to communicatively couple said data processor with said control processor, wherein
said mirror recovery map comprises a first plurality of bits,
said data processor comprises:
a first data module configured to set a bit of said first plurality of bits corresponding to said region of said virtual data volume.

22. The data processing system of claim 21, wherein said data processor further comprises:
a second data module configured to transmit a first signal to said control processor using said interface module, to receive a second signal from said control processor using said interface module in response to a transmission of said first signal, and to reset said bit of said first plurality of bits corresponding to said region of said virtual data volume in response to a receipt of said second signal.

23. The data processing system of claim 22, wherein
said change track map comprises a second plurality of bits, and
said control processor comprises:
  a control module configured to receive said first signal from said data processor using said interface module, to set a bit of said second plurality of bits corresponding to said region of said virtual data volume, and to transmit said second signal to said data processor using said interface module in response to a setting of said bit of said second plurality of bits.

24. The data processing system of claim 22, wherein
said first signal indicates that at least one of said first plurality bits is to be reset, and
said second signal indicates that data associated with said at least one of said first plurality of bits has been replicated within said second plurality of bits.

* * * * *